(No Model.) 2 Sheets—Sheet 1.

H. W. HILDEBRAND.
POTATO PLANTER.

No. 250,359. Patented Dec. 6, 1881.

WITNESSES

INVENTOR (No Model.) 2 Sheets—Sheet 2.
H. W. HILDEBRAND.
POTATO PLANTER.
No. 250,359. Patented Dec. 6, 1881.
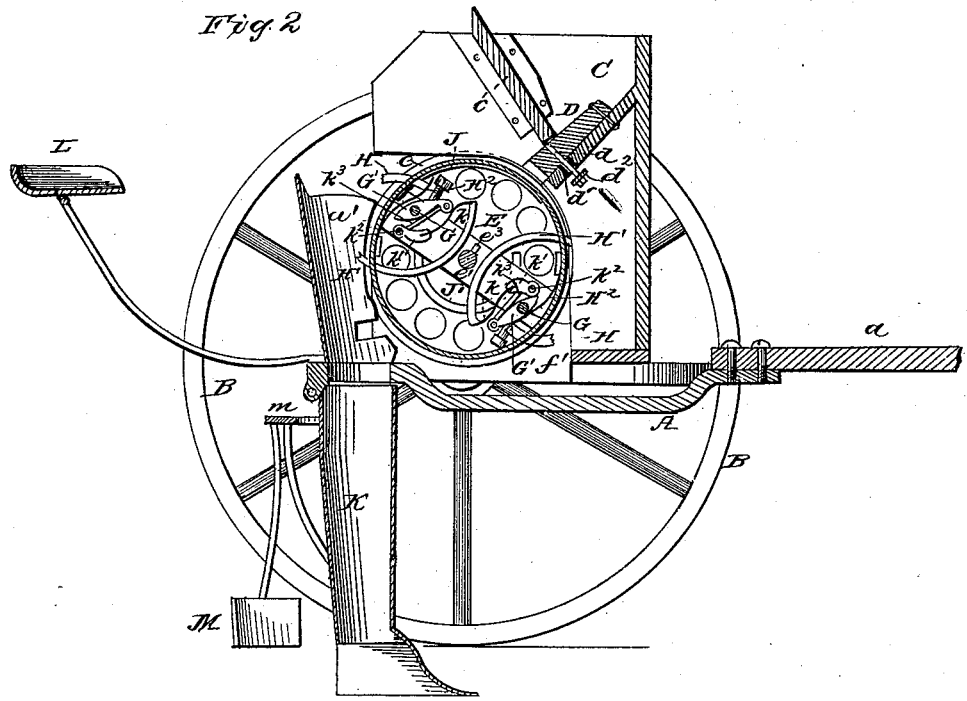
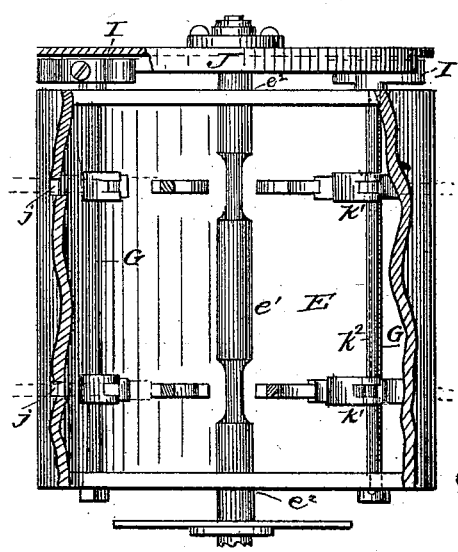
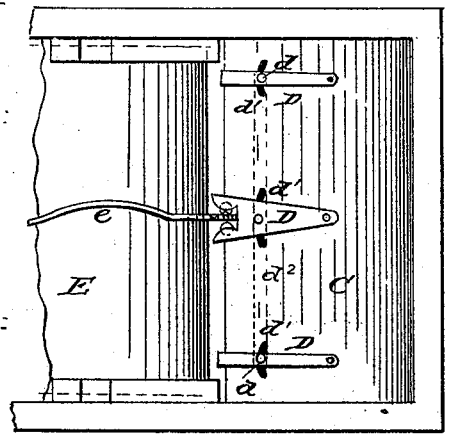
WITNESSES
INVENTOR
Attorneys

UNITED STATES PATENT OFFICE.

HENRY W. HILDEBRAND, OF CROSSON, COLORADO.

POTATO-PLANTER.

SPECIFICATION forming part of Letters Patent No. 250,359, dated December 6, 1881.

Application filed October 6, 1881. (No model.)

*To all whom it may concern:*

Be it known that I, HENRY WILLIAM HILDEBRAND, a citizen of the United States, re-residing at Crosson Post Office, in the county of Jefferson and State of Colorado, have invented certain new and useful Improvements in Potato-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 1:
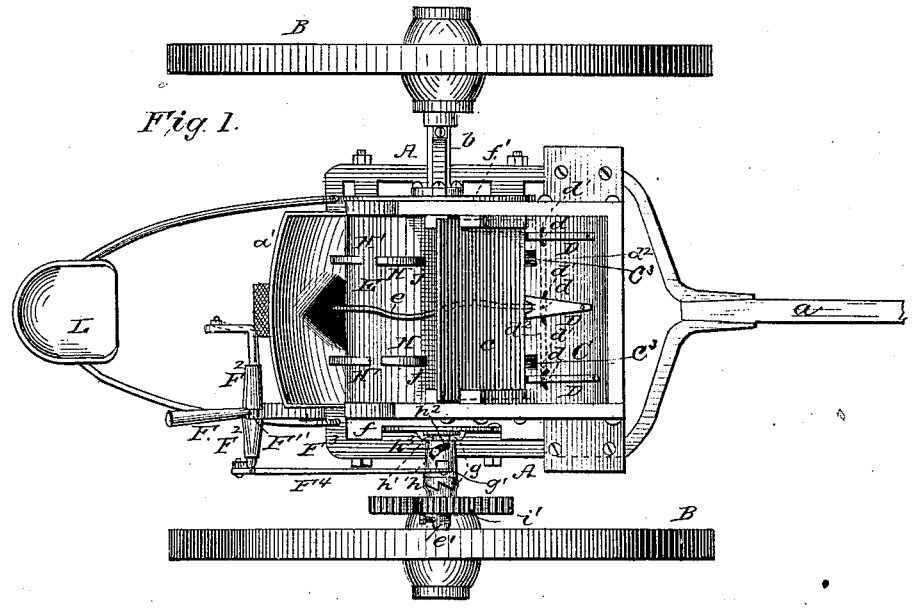
Figure 3:
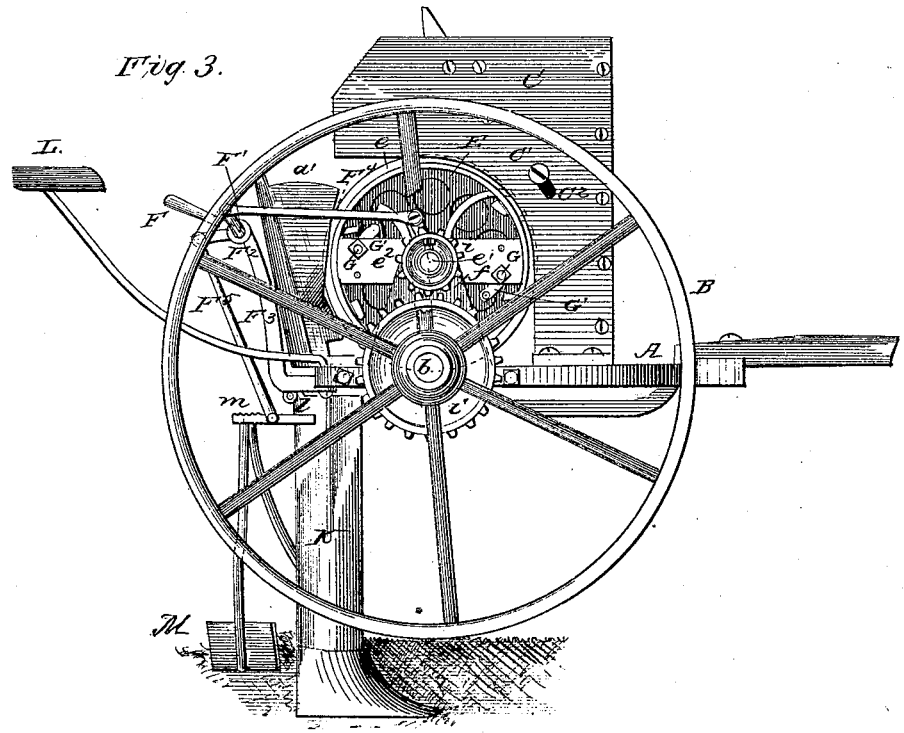

Figure 1 is a plan view of my improved potato-planter. Fig. 2 is a vertical section thereof. Fig. 3 is a side view of the same. Fig. 4 is a detailed horizontal section through the dropping-cylinder; and Fig. 5 is a detailed plan view of the hopper, showing the agitator-operating lever.

This invention relates to improvements in potato-planters, its object being to effect the uniform and expeditious dropping of the potatoes; and it consists in the employment of a rotary cylinder having arms adapted to be projected and take hold of the potatoes, and be retracted to release the potatoes for dropping into the ground, and in other details of construction, substantially as hereinafter more fully set forth.

In carrying out my invention I employ a frame, A, to which the tongue $a$ is affixed at its front end, and a hopper, $a'$, at its rear end over a rectangular or other shaped opening therein. The axles $b$, having the wheels B, are also affixed to or cast with the frame A.

C is the main hopper, secured upon the front end of the frame A, for holding the seed-potatoes for planting. As usual, this hopper has a removable part or slide, $c$.

Pivoted upon the bottom of the hopper C are three (more or less) agitators, D, for loosening the potatoes and feeding them out of the hopper. Each agitator is provided with a pin, $d$, near its lower end, which works in a curved slot, $d'$, and is fastened to a bar, $d^2$, upon the under side of the bottom of the hopper. This arrangement transmits the motion of the central agitator to the side agitators, the latter receiving motion from a cam-flange, $e$, on the periphery of the dropping-cylinder E. The cylinder E has a central shaft, $e'$, supported in bars $e^2$, fastened across its ends and to its periphery. This shaft is feathered, as at $e^3$, in the bars $e^2$, to prevent it turning independent of the cylinder, and is supported in a plate or standard, $f$, at one end, and in a plate, $f'$, at the other end, these plates being secured to the sides of the frame A.

Upon one end of the cylinder-shaft $e'$ is a toothed sleeve, $g$, which is adapted to turn with the shaft, and has a collar or flange, $g'$, to connect it to a second sleeve, $h$, but so as to turn independently thereof. This sleeve $h$ is fitted and turns upon a hub, $h'$, upon one of the shaft-supports. The toothed sleeve $g$ is adapted to engage with a loose pinion, $i$, upon the cylinder-shaft $e'$, likewise toothed upon one side and gearing with a cog-wheel, $i'$, upon one of the driving-wheels B. The sleeve $h$ has an oblique slot, $h^2$, which receives a pin, $h^3$, upon the hub $h'$ of the standard, above referred to.

F is a hand-lever fixed to a crank-shaft, $F'$, bearing in boxes $F^2$, preferably cast with a standard or support, $F^3$, fastened to the rear end of the frame A. One arm or crank of the shaft $F'$ is connected by a rod, $F^4$, to the clutch-sleeve $h$. By this mechanism motion is imparted to the cylinder, and by proper manipulation of the lever F it will be observed that the cylinder may be thrown in or out of operation at will. Hung in the cylinder E are two other shafts, G, arranged opposite to each other and in close proximity to the periphery of the cylinder. Each of these shafts is provided with two cams, G', upon the inside of the cylinder, beveled upon their sides next to the cylinder. For each of these cams there are two curved or segmental arms or claws, H H', projecting or working through slots $j$ in the periphery of the cylinder. The shorter arm H is seated upon a spring, $H^2$, secured to the inside of the cylinder. The cam G' bears or acts upon this spring. The inner end of the longer arm or claw is connected to a spring, $k$, fastened to a head, $k'$, hinged or pivoted upon a rod, $k^2$, located adjacent to the shaft G, and secured in the ends or bars of the cylinder.

To the head $k'$ is connected the cam G' by a lever, $k^3$, articulated to the head close to its pivotal point upon the rod $k^2$, by which a greater and quicker throw of the longer arm or claw is obtained, to enable it to act promptly and efficiently with the shorter arm or claw. These arms, a pair of which is arranged near each end and upon each side of the cylinder, serve to take the potatoes uniformly and expeditiously from the main hopper, the cylinder being arranged under the hopper.

Upon the ends of the shafts G, projecting outside of the cylinder, are cams I I, triangular in shape, each of the two faces of each cam having an angle of about forty-five degrees to the plane of its center, the purpose of which will be seen presently.

J J' are two segmental or curved ways, one attached to the upper end of the plate $f'$ and having its concavity facing downward, and the other attached to about the middle of the said plate and having its concavity facing or turned upward, and of the segment of a circle of sufficiently less diameter to permit the presentation of one face of the cam I thereto just as its other face is escaping from the other way, J. The effect of this movement or action of the cam upon the ways is to project the claws or arms and cause them to move toward each other and nearly together to take hold of the potatoes as they issue from the hopper upon the claws, each pair of arms or claws taking one potato at a time to drop the same into the proper hill. The two segments or arcs J J' are spaced apart at their ends sufficiently to permit of the turning of one face of a cam from one arc and the other face of the cam to the other arc or way as the claws are retracted or opened to drop the potatoes.

K is the boot, having, as usual, a plow at its lower end to form the furrow to receive the potatoes, and pivoted or hinged to the frame A in line with the hopper $a'$, to allow it to swing rearward in the event of contact with an obstacle.

A lever with suitable connections is designed to be arranged within convenient reach of the driver or operator seated upon the seat L, mounted suitably upon the frame A, and to act upon the spring-catch so as to release it by hand when desired.

The boot is connected to a second crank or arm of the shaft F' by a rod, $F^5$, to allow it to be lifted, when desired, by the lever F. To the rear upper end of the boot is affixed a footpiece, $m$, and from this may depend (though they may be secured at other convenient point at the rear of the boot) the coverers M, to cover up the potatoes after planting. The foot-piece $m$ affords a means for the operator to steady the working position of the boot.

It will here be observed that the bottom of the hopper C is rendered adjustable by screws C' and slots $C^2$ in its sides to accommodate large or small potatoes, and that it is also slotted upon its lower edge, as at $C^3$, to permit the claws to enter the hopper and take hold readily upon the potatoes.

The operation of the device is obvious to those skilled in the art. The cams within the cylinder tend to protrude or retract the jaws H, which, passing through the slots $C^3$ in the adjustable hopper, serve to grasp a potato and carry it over the cylinder into the planting-boot. The lever F lifts the boot K and simultaneously disengages the clutch-sleeves and throws the cylinder out of operation, and the coverers M operate in the ordinary manner.

The details of construction are fully set forth in the drawings.

I claim and desire to secure by Letters Patent—

1. In a potato-planter, the combination, with the cylinder, of the projecting and retracting claws or arms, flexibly connected, one to a head pivoted to a rod, and the other arm or claw seated upon a spring acted upon by a cam upon a shaft, said cam connected to the head of the other claw, substantially as set forth.

2. In a potato-planter, the combination, with the cylinder, the claws of which are capable of projection and retraction, and whose shafts have double-faced cams, each an angle of forty-five degrees, (more or less,) of the greater and lesser segments J J', spaced apart at their ends, substantially as specified.

3. In a potato-planter, the combination, with the hoppers C and $a'$, the former having agitators and an adjustable bottom, and the boot L, having a foot-piece, of the cylinder having projecting and retracting claws, operated as described, substantially as and for the purpose specified.

In testimony whereof I affix my signature in presence of two witnesses.

HENRY W. HILDEBRAND.

Witnesses:
C. S. MOORE,
F. W. YAGER.